(12) United States Patent
Holdampf et al.

(10) Patent No.: US 7,419,218 B2
(45) Date of Patent: Sep. 2, 2008

(54) RISING PIVOT SEAT

(75) Inventors: Carl J. Holdampf, Farmington Hills, MI (US); Robert I. Homier, Plymouth, MI (US); Gregory L. Eilers, Stockbridge, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 0 days.

(21) Appl. No.: 11/692,225

(22) Filed: Mar. 28, 2007

(65) Prior Publication Data

US 2007/0228796 A1 Oct. 4, 2007

(51) Int. Cl.
*B60N 2/48* (2006.01)

(52) U.S. Cl. .............................. 297/378.12; 297/344.1; 297/341; 297/336

(58) Field of Classification Search ............ 297/378.12, 297/378.1, 344.11, 341, 336
See application file for complete search history.

(56) References Cited

U.S. PATENT DOCUMENTS

| | | | | |
|---|---|---|---|---|
| 2,160,015 A | * | 5/1939 | Haberstump | 297/341 |
| 2,795,265 A | * | 6/1957 | Albrecht | 297/341 |
| 2,926,948 A | * | 3/1960 | Koplin et al. | 296/66 |
| 2,955,644 A | * | 10/1960 | Kramer | 296/64 |
| 4,695,094 A | | 9/1987 | Siebler | |
| 4,969,682 A | | 11/1990 | Gray | |
| 5,507,561 A | | 4/1996 | Fourrey et al. | |
| 6,070,934 A | * | 6/2000 | Schaefer et al. | 297/14 |
| 6,270,141 B2 | | 8/2001 | Moon et al. | |
| 6,817,670 B2 | | 11/2004 | Macey | |
| 6,863,347 B2 | | 3/2005 | De Nichilo | |
| 6,902,236 B2 | | 6/2005 | Tame | |
| 6,983,993 B2 | | 1/2006 | Hahn | |

* cited by examiner

*Primary Examiner*—Laurie K Cranmer
(74) *Attorney, Agent, or Firm*—Magna International Inc.

(57) ABSTRACT

A seat assembly is provided for supporting an occupant above a floor in an automotive vehicle. The seat assembly includes a seat back operatively coupled to a seat cushion for movement between a generally upright seating position and a forwardly folded flat position with the seat back overlying the seat cushion. The seat assembly also includes a fold flat mechanism. The fold flat mechanism includes a guide track extending between a forward end and a rearward end. A control link has a first end pivotally and glidingly coupled to the guide track for sliding movement between the forward and rearward ends while pivoting thereabout and a second end pivotally coupled to the seat back for pivotal movement thereof. A swing link is operatively coupled between the control link and the guide track for controlling the pivoting and sliding movement of the control link along the guide track in response to the pivotal movement of the seat back thereby translating the seat back upwardly and forwardly relative to the seat cushion during the movement from the seating position to the forwardly folded flat position.

11 Claims, 5 Drawing Sheets

RISING PIVOT SEAT

FIELD OF THE INVENTION

The invention relates to seat assemblies for an automotive vehicle. More particularly, the invention relates to a fold flat mechanism for moving the seat back between a seating position and a forwardly folded flat position overlying the seat cushion.

DESCRIPTION OF RELATED ART

Automotive vehicles include seat assemblies for supporting an occupant within the vehicle. The seat assemblies include a generally horizontal seat cushion and a seat back pivotally coupled to the seat cushion by a recliner assembly, allowing adjustment of the seat back relative to the seat cushion between a plurality of reclined seating positions.

It is often desirable for the seat assemblies to have a seat back that is moveable from any of the plurality of reclined seating positions to a forwardly folded flat position for extending the cargo carrying capacity of the automotive vehicle. Typically, the seat assemblies having a seat back capable of movement into this forwardly folded flat position require two pivot points. A lower recliner pivot is required to satisfy comfort criteria and provides adjustment of the seat back relative to the seat cushion between the plurality of reclined seating positions. An upper fold flat pivot is also required to allow the seat back to move from any of the plurality of reclined seating positions to the forwardly folded flat position since the seat back has to be elevated to provide clearance between the seat back and the seat cushion. However, the portion of the seat back below the upper fold flat pivot has to fold between stationary brackets supporting the upper fold flat pivot. Therefore, the seat back bolsters below the upper fold flat pivot have to be removed in order for the seat back to clear the stationary brackets. The amount of the seat back bolsters removed creates an unsightly appearance and an occupant comfort problem.

Another problem encountered during the movement of the seat back to the forwardly folded flat position is that of interference between a headrest or top of the seat back with a part of the interior of the vehicle, particularly the headliner or dashboard.

Accordingly, there is a need for a mechanism that raises the lower recliner pivot when the seat assembly folds flat allowing the upper fold flat pivot to be removed, thereby using the lower recliner pivot at the bottom of the seat back as the fold flat pivot. In addition, the mechanism will control the folding of the seat back to prevent interferences between the seat back and the interior of the vehicle.

SUMMARY OF THE INVENTION

According to one aspect of the invention, a seat assembly is provided for supporting an occupant above a floor in an automotive vehicle. The seat assembly includes a seat back operatively coupled to a seat cushion for movement between a generally upright seating position and a forwardly folded flat position with the seat back overlying the seat cushion. The seat assembly also includes a fold flat mechanism. The fold flat mechanism includes a guide track extending between a forward end and a rearward end. A control link has a first end pivotally and slidingly coupled to the guide track for sliding movement between the forward and rearward ends while pivoting thereabout and a second end pivotally coupled to the seat back for pivotal movement thereof. A swing link is operatively coupled between the control link and the guide track for controlling the pivoting and sliding movement of the control link along the guide track in response to the pivotal movement of the seat back thereby translating the seat back upwardly and forwardly relative to the seat cushion during the movement from the seating position to the forwardly folded flat position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
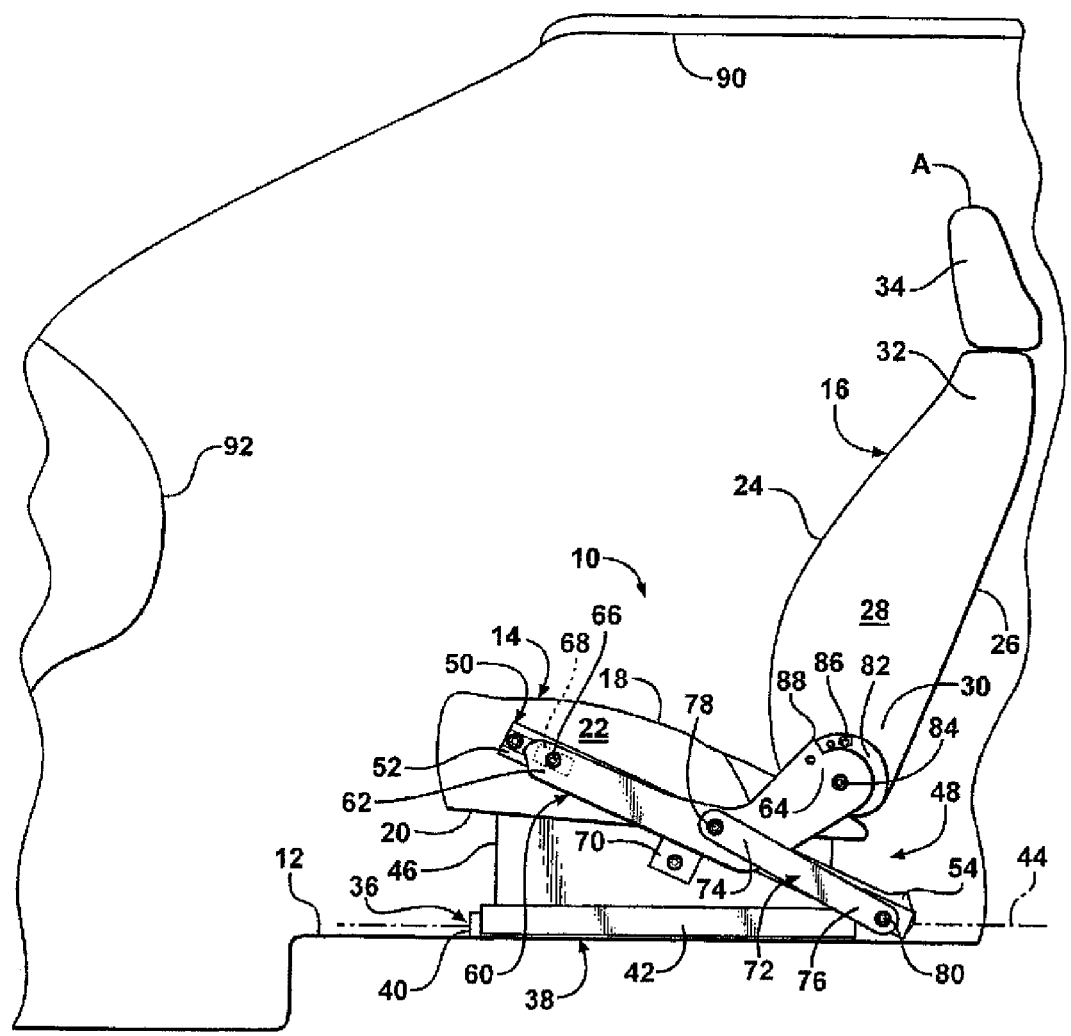
FIG. 1 is a side view of a seat assembly in a seating position according to the invention.

Referring to FIG. 1, a seat assembly is generally shown at 10 for supporting an occupant above a floor 12 in an automotive vehicle. The seat assembly 10 includes a seat cushion, generally indicated at 14, and a seat back, generally indicated at 16. The seat cushion includes a seating surface 18, an opposite bottom surface 20, and side surfaces 22 (one shown). The seat back 16 includes a supporting surface 24 for supporting the back of the occupant, an opposite back surface 26, and side surfaces 28 (one shown). The seat back 16 extends between a bottom end 30 and a top end 32, and may include a headrest 34 operatively coupled to the top end 32. Although the seat assembly 10 is shown in a front row of the vehicle, it will be appreciated that the seat assembly 10 may be utilized in any seat location within the vehicle, such as a second or third row, without varying from the scope of the invention.

A track assembly, generally shown at 36, is provided for adjusting the seat assembly 10 fore and aft. The track assembly 36 includes a pair of laterally spaced apart track mechanisms, generally indicated at 38 (one shown). Each track mechanism 38 includes a fixed track 40 adapted to be mounted to the floor 12 and a moveable track 42 slidingly engaging the fixed track 40. The fixed 40 and moveable 42 tracks define a longitudinal axis 44. The moveable track 42 is slidingly adjustable relative to the fixed track 40 along the longitudinal axis 44. Additionally, a seat riser 46 is fixedly secured to and extends vertically between the moveable track 42 and the bottom surface 20 of the seat cushion 14 for supporting the seat cushion 14. It will be appreciated that the riser assembly 46 could be fixedly secured directly to the floor 12 without varying from the scope of the invention.

Figure 4:
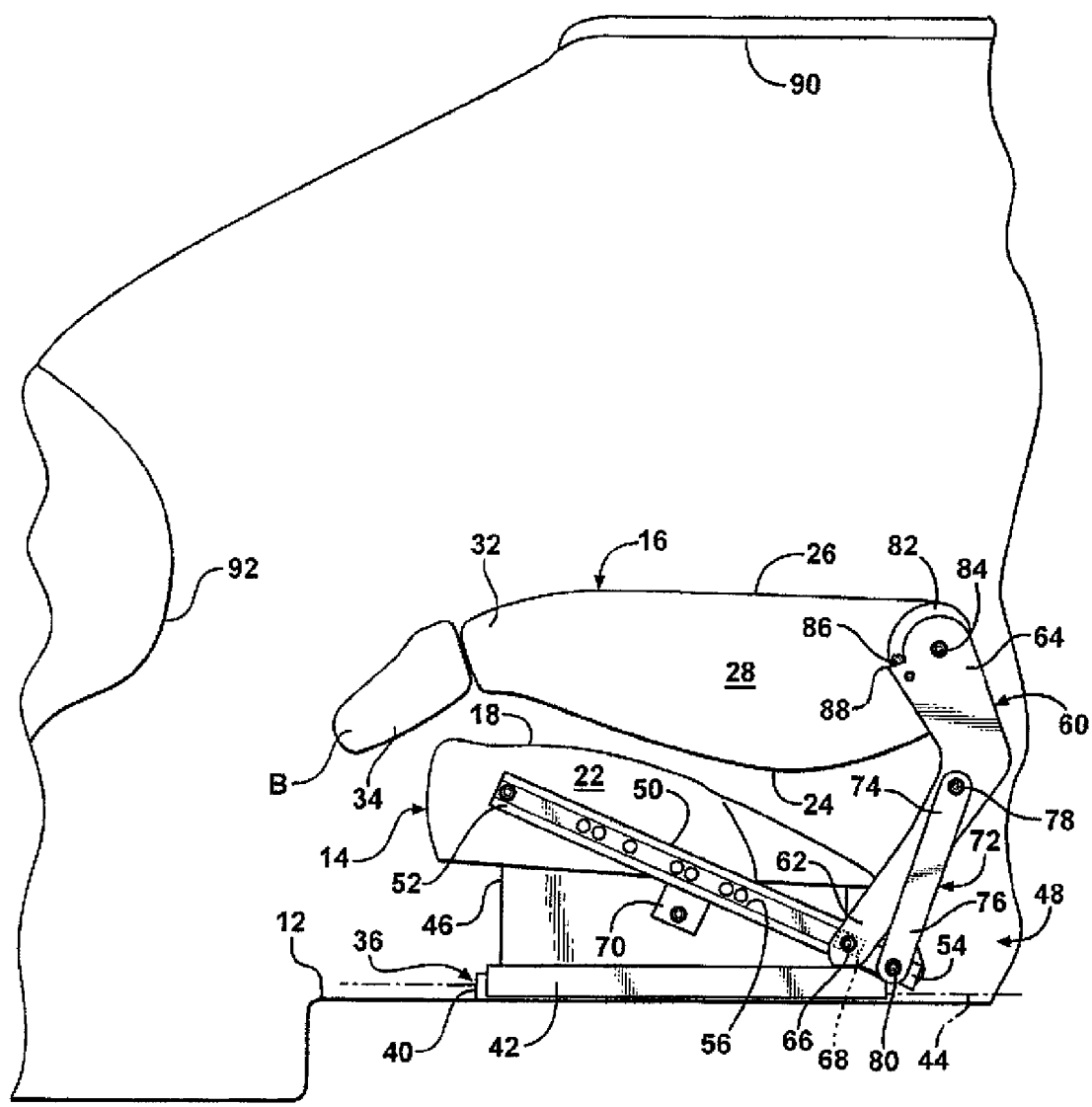
FIG. 4 is a side view of the seat assembly in a forwardly folded flat position.

A fold flat mechanism, generally shown at 48, is provided for movement of the seat assembly 10 between a seating position A, as shown in FIG. 1, and a forwardly folded flat position B, as shown in FIG. 4, with the supporting surface 24 of the seat back 16 overlying the seating surface 18 of the seat cushion 14. In the forwardly folded flat position B, the back surface 26 of the seat back 16 is disposed generally horizontal relative to the floor 12. The back surface 26 of the seat back 16 can be coplanar with other generally horizontal surfaces within the vehicle, such as other seat assemblies having forwardly folded seat backs (not shown) or a load floor (not shown) in a rear cargo area of the vehicle. Additionally, while the back surface 26 of the seat back 16 is shown generally horizontal in FIG. 4, it is recognized that the back surface 26 may be disposed at any angle relative to the floor 12.

Referring to FIGS. 1 through 4, the fold flat mechanism 48 includes a guide track, generally indicated at 50, extending between a forward end 52 and a rearward end 54. The forward end 52 of the guide track 50 is fixed relative to the side surface 22 of the seat cushion 14. The rearward end 54 is fixedly secured to the moveable track 42. Preferably, the guide track 50 is angled relative to the seat cushion 14, seat track assembly 36 and the floor 12 of the vehicle. The guide track 50 includes a slot 56 extending along the length of the guide track 50 between the forward end 52 and the rearward end 54. A fold flat stop 58 is disposed in the slot 56 at the rearward end 54 of the guide track 50.

The fold flat mechanism 48 also includes a control link, generally indicated at 60, disposed adjacent the side surfaces 22, 28 of the seat cushion 14 and seat back 16. The generally L-shaped control link 60 extends between a first end 62 and a second end 64. The first end 62 of the control link 60 is pivotally coupled at pivot 66 to a slider 68. The slider 68 is disposed in the slot 56 in the guide track 50 and slidingly coupled thereto for fore and aft travel therealong. The second end 64 is operatively coupled to the side surface 28 at the bottom end 30 of the seat back 16.

The control link 60 moves between a first position, in which the seat back 16 is in the seating position A, shown in FIG. 1, and a second position, in which the seat back 16 is in the forwardly folded flat position B, shown in FIG. 4. The control link 60 abuts a seating stop 70 fixedly secured to the riser assembly 46 when the control link 60 is in the first operative or seating position, as shown in FIG. 1. The slider 68 abuts the fold flat stop 58 at the rearward end 54 of the guide track 50 when the control link 60 is in the second position, as shown in FIG. 4.

The fold flat mechanism 48 further includes a swing link, generally indicated at 72, disposed adjacent the control link 60. The swing link 72 extends between a first end 74 and a second end 76. The first end 74 of the swing link 72 is pivotally coupled at pivot 78 to the control link 60 between the first 62 and second 64 ends. The second end 76 of the swing link 72 is pivotafly coupled at pivot 80 to the second end 54 of the guide track 50. The swing link 72 pivots about pivot 80 to guide the control link 60 between the first position and the second position.

Figure 2:
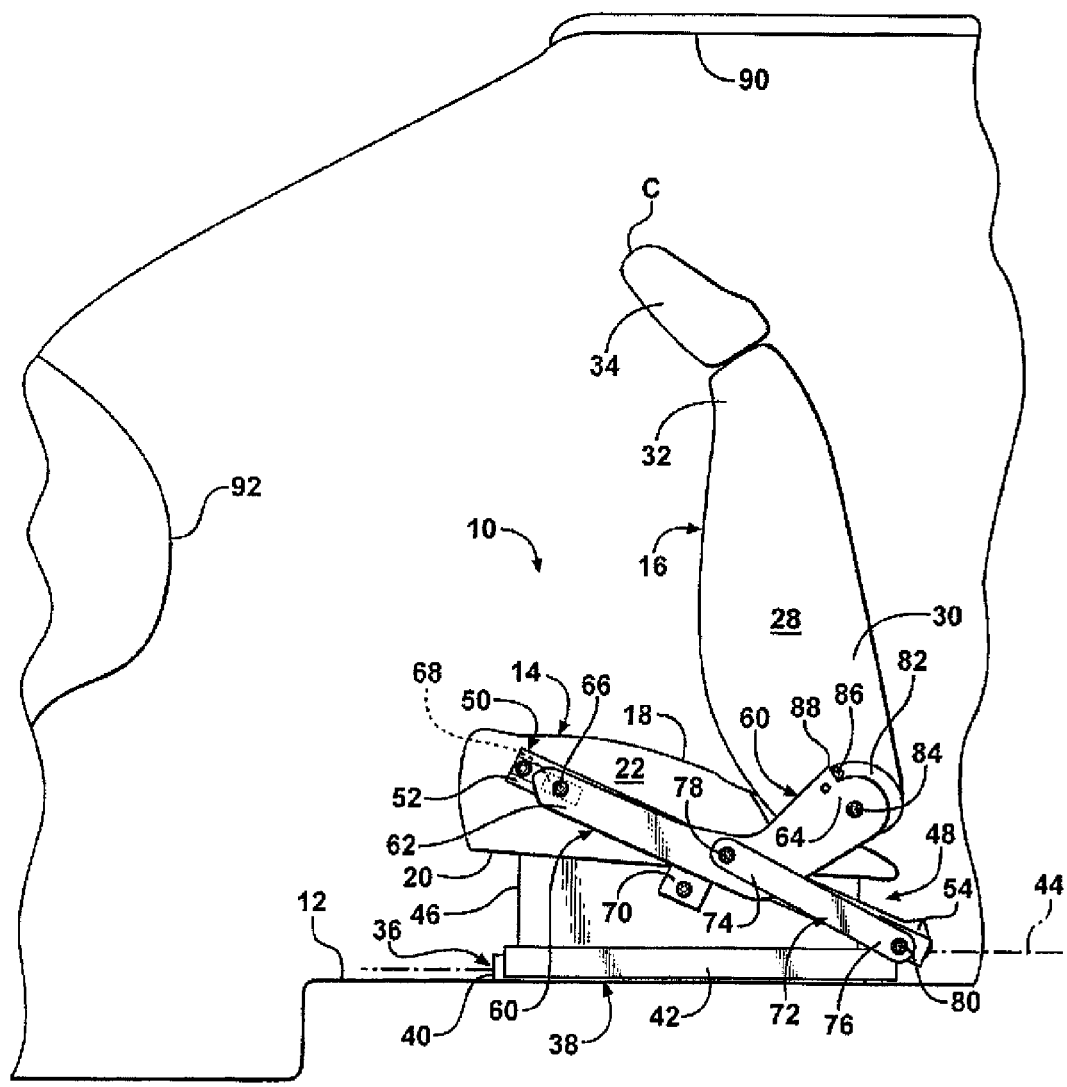
FIG. 2 is a side view of the seat assembly with a seat back in a forward pivot position.

The second end 64 of the control link 60 is adapted to receive a recliner mechanism 82, as is commonly known in the art. The recliner mechanism 82 is disposed between the second end 64 of the control link 60 and the side surface 28 at the bottom end 30 of the seat back 16. The recliner mechanism 82 provides selective angular adjustment of the seat back 16 relative to the seat cushion 14 about a recliner pivot 84 through an operative range of travel for occupant comfort, while the seat assembly 10 is in an operational or seating position. The recliner mechanism 82 includes a pin 86 extending axially therefrom. The pin 86 abuts a stop 88 at the second end 64 of the control link 60 when the seat back 16 is pivoted forwardly about the recliner pivot 84 to a forward pivot position C, as shown in FIG. 2. Preferably, forward pivot position is inctined forwardly relative to the track assembly 36 or floor 12 of the vehicle. An inertia latch (not shown) or similar device is provided to prevent the seat back 16 from pivoting forwardly from the seating position A during heavy braking or in an accident.

Figure 3:
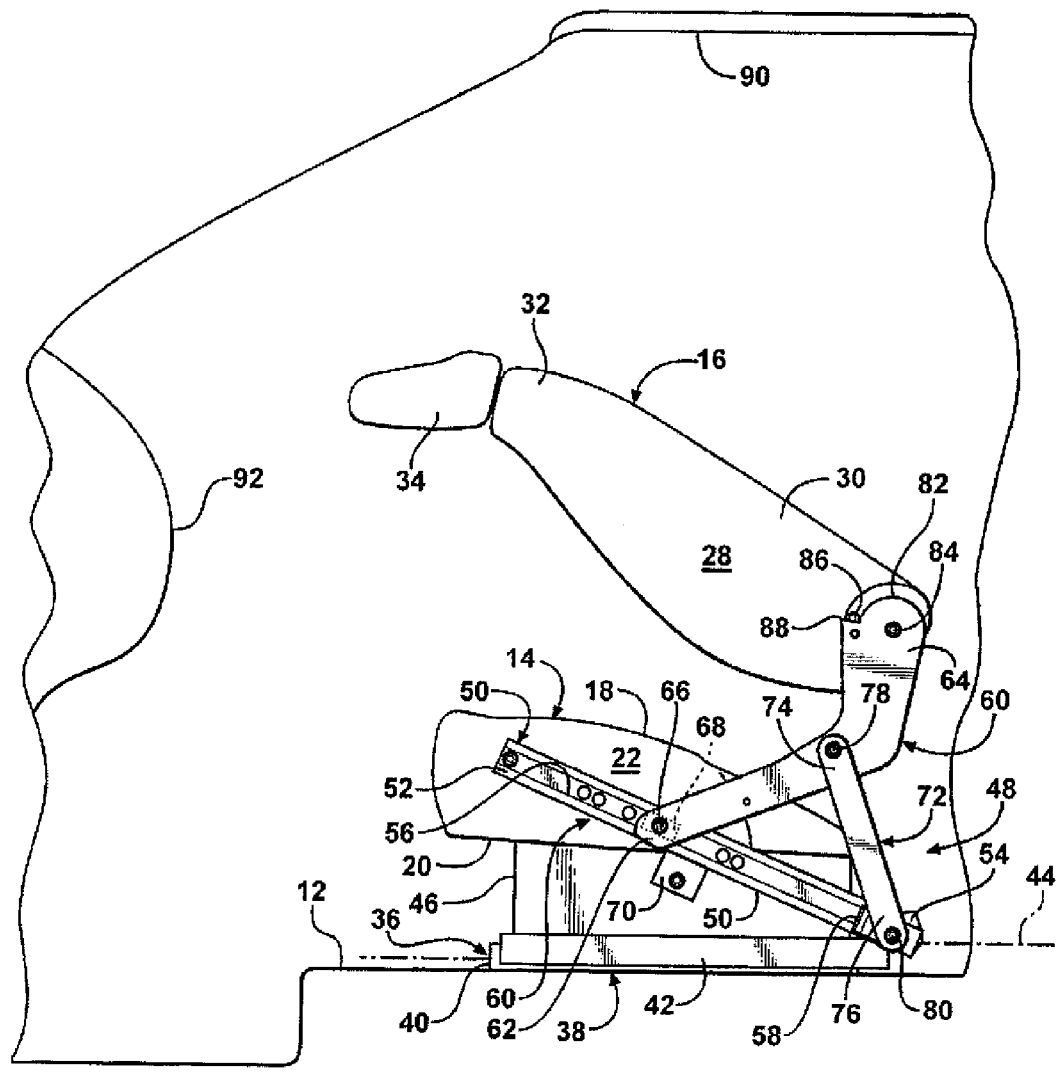
FIG. 3 is a side view of the seat assembly with the seat back forward and upward of a seat cushion.

In operation, the seat assembly 10 is normally in the seating position A, as shown in FIG. 1. The track assembly 36 can be selectively manipulated to provide fore and aft adjustment of the seat assembly 10. The recliner mechanism 82 can be selectively manipulated to provide angular adjustment of the seat back 16 relative to the seat cushion 14. With the seat assembly 10 in the seating position A, the control link 60 abuts the seating stop 70 and the slider 68 at the first end 62 of the control link 60 is disposed in the slot 56 at the forward end 52 of the guide track 50. When it is desired to extend the cargo carrying capacity of the vehicle a release handle (not shown) is actuated to forward-unlock the recliner mechanism 82 and the seat back 16 is pivoted forwardly about the recliner pivot 84 toward the seat cushion 14. The pivoting of the seat back 16 continues until the seat back 16 reaches the forward pivot position C, shown in FIG. 2, in which the pin 86 abuts the stop 88 to prevent further forward pivoting of the seat back 16 about the recliner pivot 84. Continued forward movement of the seat back 16 forces the control link 60 to pivot counterclockwise about pivot 66 at the first end 62 thereof. At the same time, the swing link 72 pivots clockwise about pivot 80 urging the slider 68 at the first end 62 of the control link 60 to slide rearward along the slot 56 in the guide track 50. In response, the second end 64 of the control link 60 moves forward and upward. As the second end 64 of the control link 60 moves forward and upward, the seat back 16 moves forward and upward relative to the seat cushion 14, thereby providing clearance between the seat back 16 and the seat cushion 14, as shown in FIG. 3. The control link 60 continues to pivot counterclockwise and therefore the seat back 16 continues to move forward and upward until the slider 68 at the first end 62 of the control link 60 abuts the fold flat stop 58 in the slot 56 at the rearward end 54 of the guide track 50, as shown in FIG. 4. The seat back 16 is now in the forwardly folded flat position B, in which the supporting surface 24 of the seat back 16 is overlying the seating surface 18 of the seat cushion 14.

Figure 5:
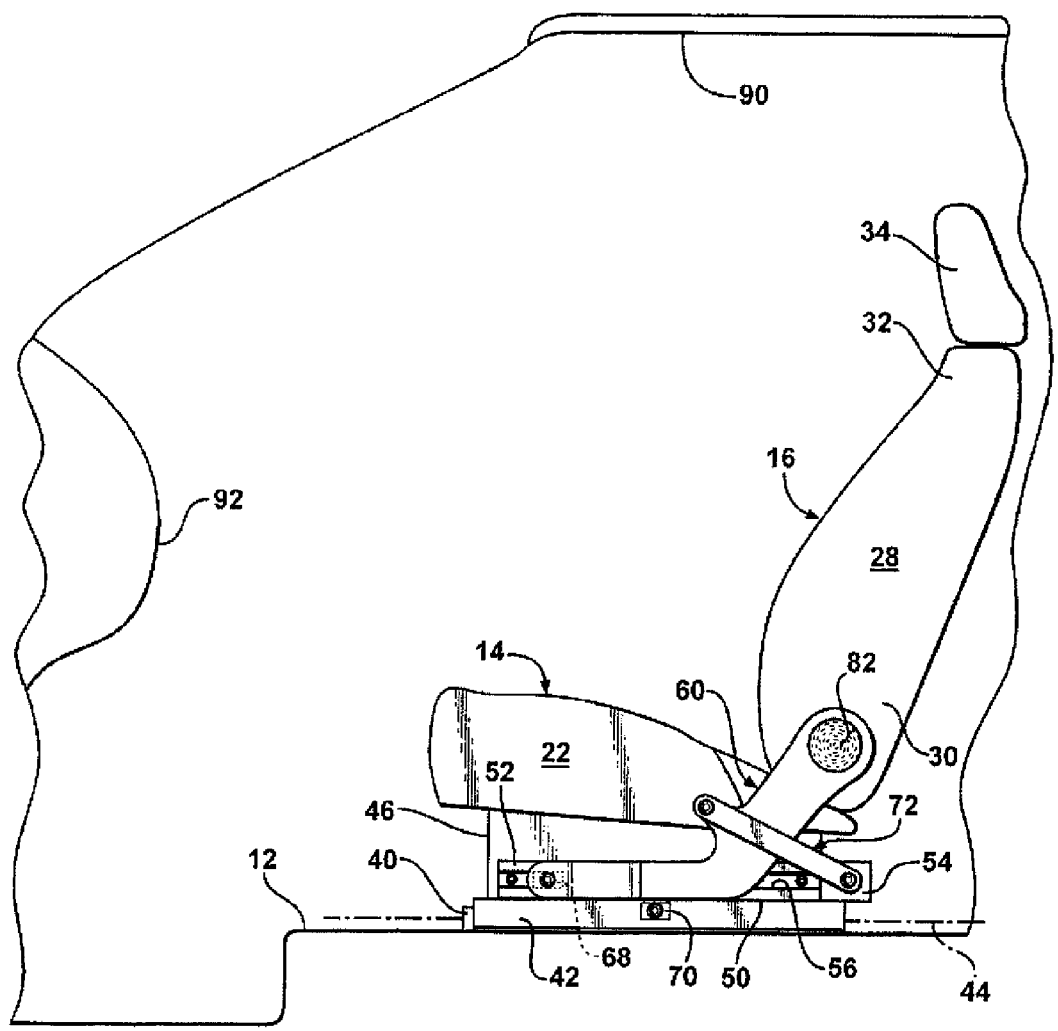
FIG. 5 is a side view of an alternative embodiment of the seat assembly.

It should be noted that the angle of the guide track 50 and the location of the forward 52 and rearward 54 ends of the guide track 50 may be altered to vary the path of the seat back 16 without varying from the scope of the invention. For example, the guide track 50 may be substantially horizontal and fixedly secured to the moveable track 42, as shown in FIG. 5, to provide the desired path of the seat back 16. The path of the seat back 16 is designed so as to avoid interferences between the headrest 34 or top end 32 of the seat back 16 with a headliner 90 or dashboard 92 of the interior of the vehicle when the seat back 16 is moved from the seating position A to the forwardly folded flat position B.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A seat assembly for supporting an occupant above a floor in an automotive vehicle, said seat assembly comprising:

a seat cushion;

a seat back operatively coupled to said seat cushion for movement between a generally upright seating position and a forwardly folded flat position with said seat back overlying said seat cushion; and a fold flat mechanism including a guide track, said guide track extending between a forward end and a rearward end, a control link having a first end pivotally and slidingly coupled to said guide track for sliding movement between said forward and rearward ends of said guide track while pivoting thereabout and a second end pivotally coupled to said seat back enabling pivotal movement thereof, and a swing link operatively coupled between said control link and said guide track for controlling said pivoting and sliding movement of said control link in response to said pivotal movement of said seat back thereby translating said seat back upwardly and forwardly relative to said seat cushion during said movement from said seating position to said forwardly folded flat position.

2. A seat assembly as set forth in claim 1 wherein said guide track includes a slot extending between said forward end and said rearward end of said guide track for slidingly receiving said first end of said control link.

3. A seat assembly as set forth in claim 2 wherein said swing link includes a first end pivotally coupled to said control link and a second end pivotally coupled to said rearward end of said guide track.

4. A seat assembly as set forth in claim 3 wherein said first end of said swing link is pivotally coupled to said control link between said first and second ends of said control link.

5. A seat assembly as set forth in claim 4 including a recliner mechanism disposed between said second end of said control link and said seat back, said recliner mechanism allowing selective angular adjustment of said seat back relative to said seat cushion through an operative range of travel.

6. A seat assembly as set forth in claim 5, wherein said recliner mechanism engages said control link at an end of said operative range of travel, whereby further pivotal movement of said seat back relative to said seat cushion, effects said translating movement of said seat back.

7. A seat assembly as set forth in claim 6, wherein said recliner mechanism includes a pin and said control link has an abutment, said pin engaging said abutment at the end of said operative range of travel.

8. A seat assembly as set forth in any one of the preceding claims, further comprising a track assembly for adjusting the seat assembly fore and aft and a riser assembly extending between said track assembly and said seat cushion, supporting said seat cushion.

9. A seat assembly as set forth in claim 8, wherein said track assembly comprises at least one track mechanism, each of said track mechanisms includes a fixed track configured to be mounted to the floor and a moveable track slidingly engaging the fixed track, said riser assembly mounted on said moveable track.

10. A seat assembly as set forth in claim 9, wherein said riser assemble assembly has a stop positioned to engage said control link when said scat back is in said seating position.

11. A seat assembly as set forth in claim 8, wherein said control link has an L-shape.

* * * * *